J. R. PALMERO.
Cotton-Seed and Corn-Planter.
No. 196,823. Patented Nov. 6, 1877.
Fig. 1.
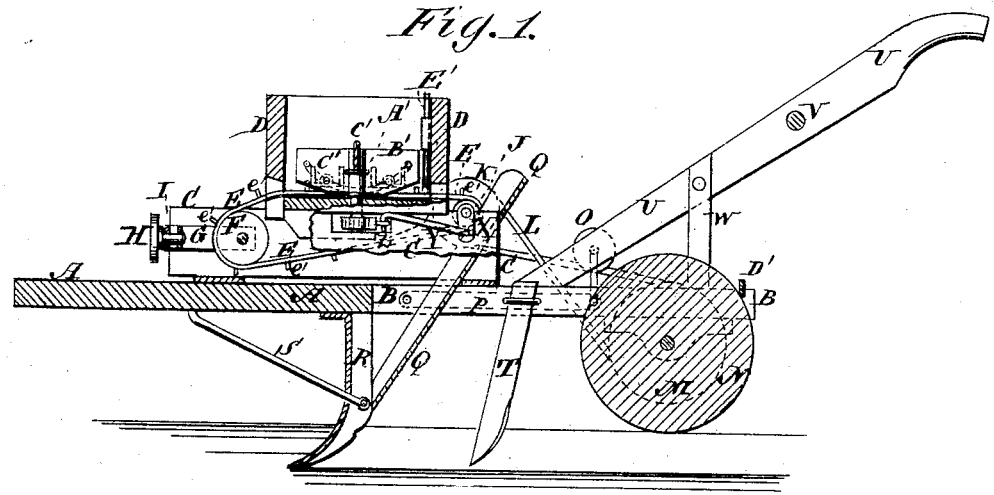
Fig. 2.
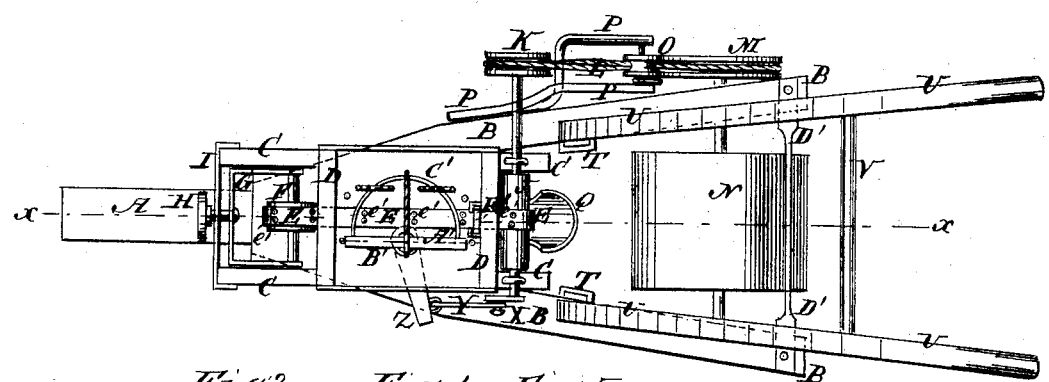
Fig. 3. Fig. 4. Fig. 5. Fig. 6.
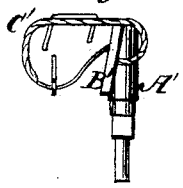 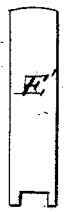  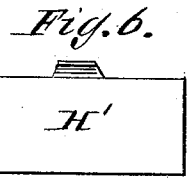
Fig. 7.
WITNESSES:
E. Wolf
J. H. Scarborough
INVENTOR:
J. R. Palmero.
BY Munn & Co
ATTORNEYS.

UNITED STATES PATENT OFFICE.

JOSEPH R. PALMERO, OF GONZALES, TEXAS.

IMPROVEMENT IN COTTON-SEED AND CORN PLANTERS.

Specification forming part of Letters Patent No. 196,823, dated November 6, 1877; application filed July 23, 1877.

*To all whom it may concern:*

Be it known that I, JOSEPH RAFAEL PALMERO, of Gonzales, county of Gonzales and State of Texas, have invented a new and useful Improvement in Cotton-Seed and Corn Planter, of which the following is a specification:

Figure 1 is a vertical longitudinal section of my improved machine, taken through the line $x$ $x$, Fig. 2. Fig. 2 is a top view of the same. Fig. 3 is a detail view of the stirrer. Fig. 4 is a detail view of the slide. Fig. 5 is a detail view of the brush. Fig. 6 is a detail view of one of the false-bottom plates for planting corn. Fig. 7 is a longitudinal section of a portion of the endless belt for dropping corn.

Similar letters of reference indicate corresponding parts.

The invention will first be described in connection with the drawing, and then pointed out in the claim.

In the drawing, A is the beam or draw-bar, to the opposite sides of the rear end of which are attached the forward ends of the side bars B. C are two parallel bars, which are attached to the middle part of the frame A B, and to the middle parts of which is attached the seed-hopper D. E is an endless belt, that passes along the bottom of the hopper D, and through holes in the lower parts of the front and rear ends of said hopper. The band E has teeth $e'$ attached to it to take hold of the cotton-seeds, and draw them out of the hopper D. The forward part of the endless belt E passes around a roller, F, the journals of which revolve in holes in the ends of a U-bar, G, the arms of which slide in grooves formed in, or in keepers attached to, the forward parts of the bars C. To the center of the U-bar G is swiveled the end of a hand-screw, H, which passes through a screw-hole in a bar, I, attached to the forward ends of the bars C, so that the endless belt E can be tightened and slackened by turning the screw H. The rear part of the endless feed-belt E passes around a roller, J, the journals of which revolve in bearings attached to the rear ends of the bars C. One of the journals of the roller J projects, and to it is attached a pulley, K, around which passes a band, L. The band L is crossed and passes around a pulley, M, attached to the projecting journal of the roller N, the journals of which revolve in bearings attached to the rear ends of the bars B, so that the dropping-belt may be driven from the roller N. The necessary tension is given to the band L by an idler, O, which rests upon the said band L, and is pivoted to the forked rear end of the bar P. The forward end of the bar P is pivoted to the forward part of the side bar B. By this arrangement the motion of the seed-dropping device is stopped by raising the idler O from the band L. As the seed passes over the roller J it drops into the spout Q, by which it is conducted into the cavity of the hollow standard of the plow R, through which it passes to the ground. The upper end of the spout Q is attached to a cross-bar attached to the bars B, and its lower end is attached to the standard of the plow R. The upper end of the standard of the plow R is attached to the rear end of the draw-bar A, and the draft-strain upon it is sustained by the brace S, the rear end of which is attached to the said standard, and its forward end is attached to the draw-bar A. The seed is covered by the plows T attached to the bars B in front of the roller N. U are the handles, the forward ends of which are attached to the middle parts of the bars B, and they are connected by the round V, and are supported by the uprights W, attached to the rear parts of the bars B. To a journal of the roller J is attached a small crank, X, to which is pivoted the rear end of a connecting-rod, Y. The forward end of the connecting-rod Y is pivoted to the outer end of the arm Z, the inner end of which has a square hole formed in it to receive the post A', the lower part of which is pivoted to the bottom of the hopper D. To the upper part of the post A' is attached a cross-bar, B', to which, and to the said post A', is attached a wire, $c'$, which is bent into curves and loops, and is provided with downwardly and upwardly projecting points, so as to keep the seed thoroughly stirred up as the post A' is rocked by the revolution of the roller J. To the rear ends of the bars B are attached the ends of a cross-bar, D', that passes along the face of the roller N, to scrape off any soil that may adhere to said roller. The amount of cotton-seed taken out by the toothed feed-belt E $e'$ is regulated by a slide, E', placed in keepers attached to the rear end of the hopper D.

When the machine is to be used for planting corn and other smooth seeds, the slide E' is replaced by the brush F', and the toothed belt E e' is replaced by a belt, G', made of two thicknesses of leather, the upper thickness having holes formed through it of such a size as to hold one or more kernels of the seed to be planted, as may be desired. In this case, also, plates H' are inserted in the hopper D in inclined positions, so as to form a false bottom to guide the seeds down to the dropping-belt G'.

Having thus fully described my invention, I claim as new and desire to secure by Letters Patent—

A planter provided with a stirrer composed of the rock-post A', cross-bar B', and wire C', the latter being curved, looped, and pointed, to operate in connection with the hopper, as shown and described.

JOSEPH R. PALMERO.

Witnesses:
J. M. CLARKE,
W. D. CAREY.